United States Patent [19]

Kohler et al.

[11] 4,451,768

[45] May 29, 1984

[54] WINDSHIELD WIPER CONTROL CIRCUIT

[75] Inventors: Alfred Kohler; Horst Rachner, both of Bietigheim-Bissingen, Fed. Rep. of Germany

[73] Assignee: ITT Industries, Inc., New York, N.Y.

[21] Appl. No.: 398,426

[22] Filed: Jul. 14, 1982

[30] Foreign Application Priority Data

Jul. 24, 1981 [DE] Fed. Rep. of Germany ....... 3129192

[51] Int. Cl.$^3$ .............................................. H02P 1/04
[52] U.S. Cl. .............................. 318/443; 318/DIG. 2
[58] Field of Search ............... 318/443, 444, 466, 470, 318/DIG. 2, 281, 282

[56] References Cited

U.S. PATENT DOCUMENTS 4,329,631  5/1982  Betsch et al. ........................ 318/466
4,388,574  1/1983  Bois et al. ............................ 318/433

*Primary Examiner*—G. Z. Rubinson
*Assistant Examiner*—Arthur G. Evans
*Attorney, Agent, or Firm*—James B. Raden; Donald J. Lenkszus

[57] ABSTRACT

A control circuit for a windshield wiper circuit provides for a depressed parking position by including a timing element which delays turn off of the motor for a time interval after the wiper reaches a position adjacent the parking position area.

5 Claims, 2 Drawing Figures

WINDSHIELD WIPER CONTROL CIRCUIT

BACKGROUND OF THE INVENTION

This invention pertains to control circuits for windshield wiper motors.

German specification OS 2,917,324 describes a circuit arrangement for a wiper installation, in which, during the normal wiper operation, the wiper moves between two reversing positions, and when it is switched off enters a so-called depressed or hidden parking position. During the normal wiper operation the direction of rotation of the electric motor is changed whenever the wiper reaches a reversing position at the border of the wiping area. One of the switching points of the reversing switch is variable in dependence on the operating switch so that when the operating switch is switched off, the wiper enters a depressed parking position, whereupon the electric motor is switched off.

In a first embodiment shown by this prior publication three position switches are assigned to the electric motor. The position switches are actuated in the depressed parking position and in the two reversing positions. The switching signals of these position switches are evaluated in a switching stage and used for controlling a relay-operated reversing switch. This circuit arrangement requires a relatively high amount of wiring, because three leads have to be conducted from the position switches at the motor to the switching stage.

In a second version known from this prior publication the amount of wiring has been reduced by replacing the position switches with a rotational-speed sensor. But the evaluation of the pulses of this rotational-speed sensor with counter and comparator stages requires a high amount of circuitry. Therefore this version will presumably only be realized by using microprocessors or microcomputers.

SUMMARY OF THE INVENTION

The invention simplifies the circuitry of a circuit arrangement for a windshield wiper installation in which the wiper comes to rest in a so-called parking position.

In accordance with the principles of the invention a windshield wiper control circuit includes a timing element which when the operating switch is switched off, is used to delay the time at which the motor switches off after reaching a predetermined position.

The invention is thereby based on the consideration that in wiper installations having a depressed parking position, the wiper position in the parking position may deviated from a desired value by a few angular degrees, because the wiper is not within the driver's view. It is therefore not absolutely necessary to exactly define this submerged parking position by a position switch.

When the wiper motor according to the present invention is switched off via a timing element with delay, the third position switch used in prior arrangements as well as a corresponding amount of circuitry can be saved.

Further in accordance with the invention the delay time of the timing element may be varied in inverse relation to the speed of the wiper motor. The delay time of the timing element will then vary in dependence on the frictional conditions of the windshield. When the speed of motor rotation and thus the wiping speed are high, the delay time of the timing element is shorter than when the speed of rotation and the wiping speed are slow.

BRIEF DESCRIPTION OF THE DRAWING

The invention may be better understood from a reading of the following detailed description in conjunction with the drawing in which like reference numerals designate like parts and in which.

DETAILED DESCRIPTION

Figure 1:
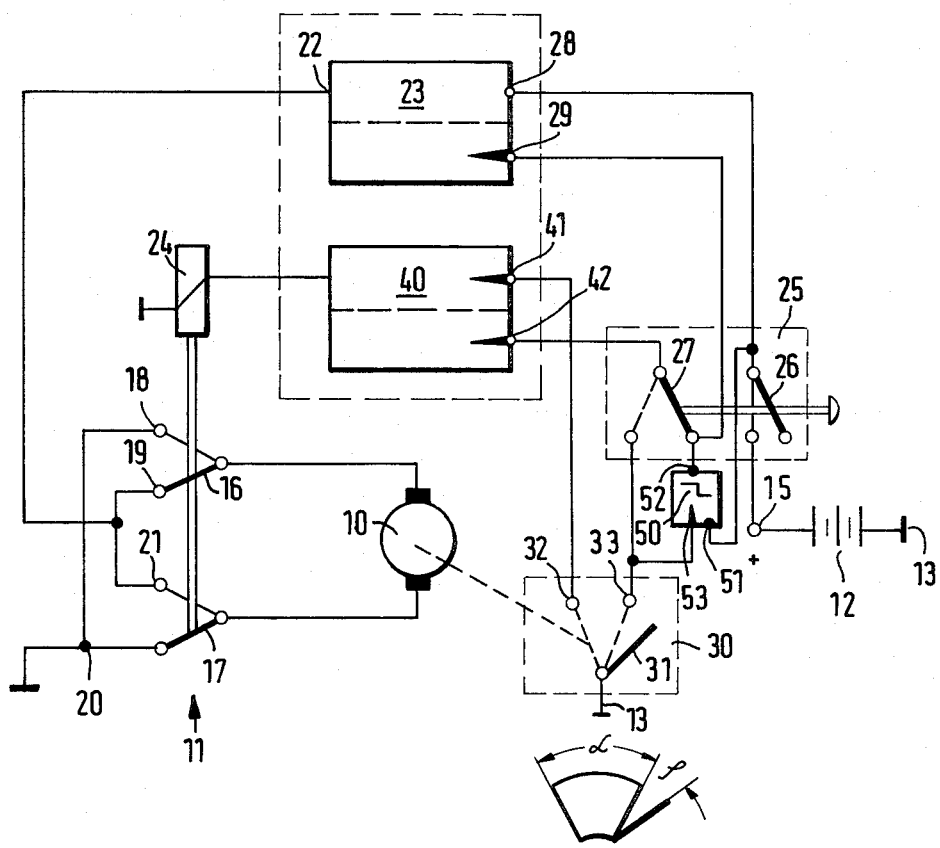
FIG. 1 is a schematic of a control circuit utilizing a timing element having fixed delay.

The electric motor 10 is coupled to a voltage source 12 via a reversing switch 11. The positive pole of this voltage source is designated by 15 and the negative pole or the ground connection is designated by 13. The electric motor 10 is directly connected to two movable bridging contacts 16 and 17 of the reversing switch 11. The stationary contacts 18 and 20 are interconnected and connected to ground 13. The other two stationary contacts 19 and 21 are also interconnected and connected to the output 22 of a main memory 23. The movable bridging contacts 16 and 17 are jointly switched via a relay 24. An operating switch 25 has a normally open contact 26 and a changeover contact 27, which are operated together.

A position switch 30 is actuated by the electric motor 10. The position switch 30 may be realized by a switching disk. A contact segment 31, which is permanently connected to ground 13, co-operates with the stationary contacts 33 and 32 respectively in the changeover positions of the wiper during the normal wiper operation. This contact segment 31 is shown in the position it occupies in the depressed parking position. When the electric motor turns by the amount of an angle of rotation $\Psi$, the contact segment 31 hits the stationary contact 33 and releases a switching signal. This happens when, during the normal wiper operation, the wiper occupies the first reversing position neighboring the depressed parking position. The other reversing position is reached, when the contact segment 31 is supported on the stationary contact 32. In this switching position of the contact segment 31 a second switching signal is released.

The circuit includes a reversing memory 40 with a set input 41 and a reset input 42, which controls the relay 24. The set input 41 responding to negative voltage slopes is connected to the stationary contact 32. The rest input 42 may be selectively connected via the changeover contact 27 to the stationary contact 33 or to the outut of a timing element 50, whose input is also connected to the stationary contact 33.

A static set input 28 of a main memory 23 is connected to the normally open contact 26 of the operating switch. A dynamic reset input 29 of the main memory 23 is connected to the output of the timing element 50.

In the following description of the operation of the circuit arrangement it is assumed that the two memories 23 and 40 are initially reset and the relay 24 is therefore not excited. The various bridging contacts occupy the switching position shown in the drawing. The wiper occupies the depressed parking position.

If the operating switch 25 is operated, positive potential is conducted via the normally open contact 26 to the set input 28 of the main memory 23. Positive potential appears at output 22 and is conducted to the electric motor 10 via the changeover bridging contact 16. A power stage such as a relay may be interposed between output 22 and the motor. Because the other changeover bridging contact 17 is connected to ground the motor 10 is energized. Simultaneously with changing over of a normally open contact 26 the changeover contact 27 also changes over to the position shown by broken lines, but this does not affect the switching condition of the reversing switch 40.

The electric motor rotates in counter-clockwise direction, so that eventually when an angle $\Psi$ has been passed, the contact segment 31 hits the stationary contact 33 and thus releases a first switching signal. Although this switching signal is conducted via the changeover contact to the reset input 42 of reversing memory 40, it does not have any influence, because reversing memory 40 was in a reset state. Thus the direction of rotation of the electric motor remains unchanged until eventually, after an angle of rotation $\alpha$ has been passed, the contact segment 31 hits the stationary contact 32. Thus a second switching signal is released which is conducted to the set input 41 of the reversing memory 40. Thereby the reversing memory 40 is set and the relay 24 responds and adjusts the bridging contacts 16 and 17 to the position shown by broken lines. Thus the voltage supplied to the electric motor 10 is reversed and the motor rotates in the other direction. If now the contact segment 31 again hits the stationary contact 33 a first switching signal is released again which now resets the reversing memory 40. Thus the relay 24 is de-energized and the direction of rotation of the motor is changed again. This process is continuously repeated as long as the operating switch is switched on. The wipers move within the wiping area determined by the angle $\alpha$ between the two reversing positions. Switching signals are released at any time the contact segment 31 hits the stationary contacts 32 or 33, through which switching signals the reversing memory 40 is set or reset.

The timing element 50 has a static set input 51 which is applied to positive potential via the normally open contact 26, when the operating switch 25 is switched on. Then the timing element 50 is set, so that positive potential will be present at its output 52 as well. When the contact segment 31 hits the stationary contact 33 negative potential is conducted to the trigger input 53 of the timing element 50. But this switching signal can only trigger the timing element 50, when the operating switch 25 is switched off, for the set input 51 has priority over the trigger input 53. Thus timing element 50 is set when the operating switch 25 is switched on and retains this condition during the entire normal wiper operation.

When the wiper installation is switched off and thus the changeover contact 27 and the normally open contact 28 are again put in the position shown in FIG. 1, the switching condition of the memories 23 and 40 respectively does not change immediately. Thus the memory 23 continues to be set, so that the electric motor continues to rotate. When the contact segment 31 hits the stationary contact 37, a switching signal is released which triggers the timing element 50. Thus the delay time of the timing element 50 begins. During this delay time the electric motor continues to rotate in the original direction of rotation and brings the wiper into the depressed parking position. After the delay time of the timing element 50 has expired the potential at the output 52 jumps to ground and thereby resets both the reversing memory 40 and the main memory 23. Thus the electric motor is switched off.

Thus in this embodiment it is essential that the same switching signal which is released, when the contact segment hits the stationary contact 33, is evaluated in a different manner in dependence on the switching position of the operating switch 25. When the operating switch is switched on this switching signal 33 releases, without delay, a change of the direction of rotation of the motor. When the operating switch 25 is switched off, the timing element becomes effective and the reversing memory is reset with delay. Thus it is not necessary to provide a third position switch which defines the parking position.

Figure 2:
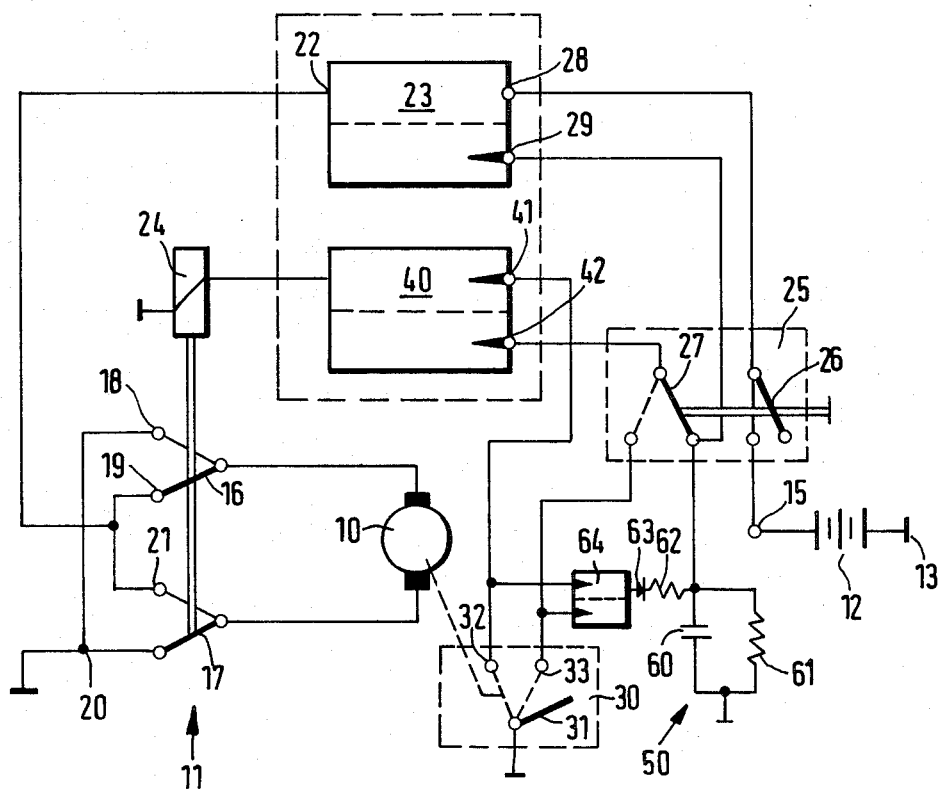
FIG. 2 is a schematic of a control circuit utilizing a timing element having a delay time which varies.

In the embodiment according to FIG. 2 the timing element 50 consists of a capacitor 60 to which a discharging resistor 61 is connected in parallel. Capacitor 60 is connected to the output of a bistable flip-flop 64 via a charging resistor 62 and a diode 63. The set input of bistable flip-flop 64 is connected to the stationary contact 32 and the reset input to the stationary contact 33. Otherwise the circuit arrangement according to FIG. 2 corresponds to that of FIG. 1. During normal wiper operation, the mode of operation is also identical. Only the time response of the timing element 50 differs, whose capacitor 60 is continuously charged and discharged during the normal wiper operation. When the contact segment 31 hits the stationary contact 32 the bistable flip-flop 64 is set, so that positive voltage is present at the output. Thus the capacitor 60 is recharged via the diode 63 and the resistor 62. As soon as in the other reversing position of the wiper the contact segment 31 hits the stationary contact 33 and thus releases a switching signal, the bistable flip-flop is reset again. Thus the capacitor 60 can discharge via the resistor 61, when the wiper moves from the first reversing position into the second reversing position. Thereafter the capacitor is recharged as described above. Consequently the charging voltage of the capacitor 60 depends on the time between the release of the two switching signals in the reversing positions of the wiper. When the wiper is operated slowly and therefore the speed of rotation of the electric motor is slow, the charging voltage of the capacitor 60 reaches a high value. In contrast, when the time the wiper takes to move from the second reversing position to the first reversing position is short, e.g., when the windshield is wet, the flip-flop 64 is also changed over earlier and thus the charging of the capacitor 60 is terminated earlier.

In the off-position of the operating switch 25 the charging voltage of this capacitor 60 is conducted to the reset input 42 of the reversing memory 40. But this reversing memory 40 is only reset, when the charging voltage has dropped to a predetermined value. This time depends on the level of the charging voltage. Consequently the reversing memory is reset via the stationary contact 33 at different times after the switching signal has been released. Thus with a relatively small amount of circuitry, the angle $\Psi$ across which the wiper moves from its first reversing position to the depressed parking position is substantially constant for different frictional conditions on the windshield, because the delay time of the timing element 50 is inversely proportional to the speed of rotation of the electric motor.

The invention has been described by way of an embodiment in which the direction of rotation of the motor is continuously changed during the normal wiper operation. But wiper installations are also known in which the direction of rotation of the electric motor remains unchanged during the normal wiper movement and the pendulum-type movement of the wiper is achieved by means of a crank mechanism. In this version the direction of rotation of the electric motor is reversed for putting the wiper in the depressed parking position. By this change in the direction of rotation a cam is displaced in such a way that the length of the crank of the crank mechanism is varied. The basic idea of the present invention can be also advantageously used in such a wiper installation. The circuit arrangement may be arranged such that the reversing switch retains its first switching position during the normal wiper operation and, when the operating switch is switched off, is changed over by the switching signal and is only reset from this second switching position into the first switching position after the delay time of the timing element has expired, whereby the motor is simultaneously disconnected from the voltage source.

Further it is pointed out that in the circuit arrangements according to the invention the additional advantage is achieved that the wiper motor is switched off even if it did not reach its predetermined parking position for instance because of a parking channel full of snow. Thus in the circuit arrangement according to the invention the electric motor is protected from blocking in the motion range between the first reversing position of the wiper and the depressed parking position. Such a timing element could therefore also be advantageously used as an additonal element in the initially mentioned known system with three position switches.

Additionally it is pointed out that a circuit arrangement according to the present invention can be used both in rear window wiper installations and in windscreen wiper installations including one or more wipers. The basic idea of the invention could also be realized in such installations in which in order to determine the normal wiper angle the pulses of a rotational-speed sensor are counted.

Finally, as will be evident to those skilled in the art, the circuit diagrams shown in the drawing are only intended to illustrate the basic idea of the invention and that a plurality of variations is possible without departing from the spirit or scope of the invention. For example the timing element might not affect the reversing memory 40, but directly the relay 24 in a way that it is switched off with delay. The timing element might also solely affect the main memory 23, if one ensured otherwise that the reversing memory 40 occupies the reset condition in any case, when the wiper installation is switched on.

What is claimed is:

1. In a windshield wiper assembly comprising:
    a voltage source;
    at least one wiper;
    an electric motor coupled to said at least one wiper and connectable to said voltage source;
    an operating switch;
    a switching stage for controlling said electric motor in response to the state of said operating switch such that when said operating switch is in a first state said electric motor is coupled to said voltage source for moving said at least one wiper in pendulum fashion between two reversing positions within a wiping area, and when said operating switch is in a second state said electric motor moves said at least one wiper to a depressed parking position wherein said electric motor is uncoupled from said voltage source;
    at least one position switch activated by said electric motor for generating a first switching signal when said wiper is at one of said reversing positions adjacent said depressed parking position; the improvement wherein:
    said switching stage comprises a timing element coupled to said at least one position switch and operable such that after said operating switch is placed in said second state said electric motor remains connected to said voltage source and said first switching signal triggers said timing element, said switching stage being responsive to said timing element such that said electric motor is disconnected from said voltage source only after a delay time determined by said timing element.

2. A windshield wiper assembly in accordance with claim 1 wherein the delay time of said timing element is inversely proportional to the speed of rotation of said motor.

3. A windshield wiper assembly in accordance with claims 1 or 2 comprising:
    a reversing switch coupled between said motor and said voltage source, said reversing switch being changed over without said delay time at each of said two reversing positions when said operating switch is in said first state, said reversing switch being changed over with said delay time when said operating switch is changed to said second state.

4. A windshield wiper assembly in accordance with claim 3 comprising:
    a first and second position switch, said first position switch providing said first switching signal when said wiper is at said one reversing position, said second position switch providing a second switching signal when said wiper is at a second one of said reversing positions;
    said reversing switch comprising a relay;
    said switching stage comprising a reversing memory and a main memory;
    said reversing memory having a set input coupled to said second position switch and responsive to said second switching signal, and having a reset input coupled to said first position switch when said operating switch is in said first stage and coupled to the output of said timing element when said operating switch is in said second state;
    said reversing memory having an output coupled to said relay for controlling operation thereof;
    said main memory having a set input coupled to said operating switch, a reset input coupled to the output of said timing element, and an output for supplying voltage to said reversing switch in dependence on whether said main memory is in a predetermined state.

5. A windshield wiper assembly in accordance with claims 1 or 2 comprising;
    a reversing switch coupled between said motor and said voltage source, said reversing switch being maintained in a first state when said operating switch is in said first state, and when said operating switch is switched to a second state said reversing switch in response to said first switching signal is changed over to a second state and is reset back to said first state after said delay time to disconnect said motor from said voltage source.

* * * * *